United States Patent [19]

Murphy

[11] Patent Number: 4,911,834
[45] Date of Patent: Mar. 27, 1990

[54] DRILLING MUD SEPARATION SYSTEM

[75] Inventor: Bernard E. Murphy, Houston, Tex.

[73] Assignee: Triton Engineering Services Company, Houston, Tex.

[21] Appl. No.: 263,522

[22] Filed: Oct. 27, 1988

[51] Int. Cl.[4] .................. B01D 35/20; E21B 21/06
[52] U.S. Cl. .................. 210/167; 210/237; 210/384; 210/389; 210/499; 209/235; 209/346; 209/367; 175/206
[58] Field of Search ............ 209/235, 346, 367, 366.5, 209/261; 210/384, 388, 389, 780, 167, 170, 237, 498, 499; 175/206

[56] References Cited

U.S. PATENT DOCUMENTS

| | | | |
|---|---|---|---|
| 1,705,619 | 6/1925 | Kendall | 209/346 |
| 1,735,067 | 11/1929 | Weston | 209/269 |
| 2,238,454 | 4/1941 | Steel et al. | 209/367 |
| 2,316,725 | 4/1943 | Symons | 209/367 |
| 2,941,783 | 6/1960 | Stinson | 175/66 |
| 3,135,685 | 6/1964 | Tanner et al. | 73/153 |
| 3,449,969 | 6/1969 | Dorris | 209/366.5 |
| 3,650,401 | 3/1972 | Riesbeck et al. | 209/325 |
| 3,666,096 | 5/1972 | Riesbeck et al. | 209/259 |
| 3,720,316 | 3/1973 | Riesbeck et al. | 209/254 |
| 3,766,997 | 10/1973 | Heilhecker et al. | 175/66 |
| 3,794,165 | 2/1974 | Riesbeck et al. | 209/325 |
| 3,899,414 | 8/1975 | Hansen | 209/17 |
| 3,970,552 | 7/1976 | Bongert | 210/19 |
| 4,021,337 | 5/1977 | Wehren | 209/367 |
| 4,319,991 | 3/1982 | Crone, Jr. et al. | 209/234 |
| 4,319,992 | 3/1982 | Davis et al. | 209/275 |
| 4,361,240 | 11/1982 | Davis et al. | 209/674 |
| 4,459,207 | 7/1984 | Young | 210/384 |
| 4,555,330 | 11/1985 | Tsutsumi et al. | 209/254 |
| 4,795,552 | 1/1989 | Yun et al. | 209/366.5 |

FOREIGN PATENT DOCUMENTS 2124099A 2/1984 United Kingdom ............ 210/388

Primary Examiner—W. Gary Jones
Assistant Examiner—Matthew O. Savage
Attorney, Agent, or Firm—Dodge, Bush & Moseley

[57] ABSTRACT

A separation system for removing drilled solids from a drilling fluid being circulated in a well including a vibratory screen apparatus (10) and method for separating materials having a base (12) supporting a vibratory support frame (13) for relative vibratory movement. A pair of transversely aligned motor vibrators (88) are mounted on a transverse horizontal support (82) secured between opposed sides (64,66) of vibratory frame (13) generally in the area of the center of gravity of the vibratory from (13). The motor vibrators (88) have rotational axes (L3) extending at an angle A with respect to the horizontal and being in a vertical plane parallel to the longitudinal axis (L1) of the screen bed.

7 Claims, 5 Drawing Sheets

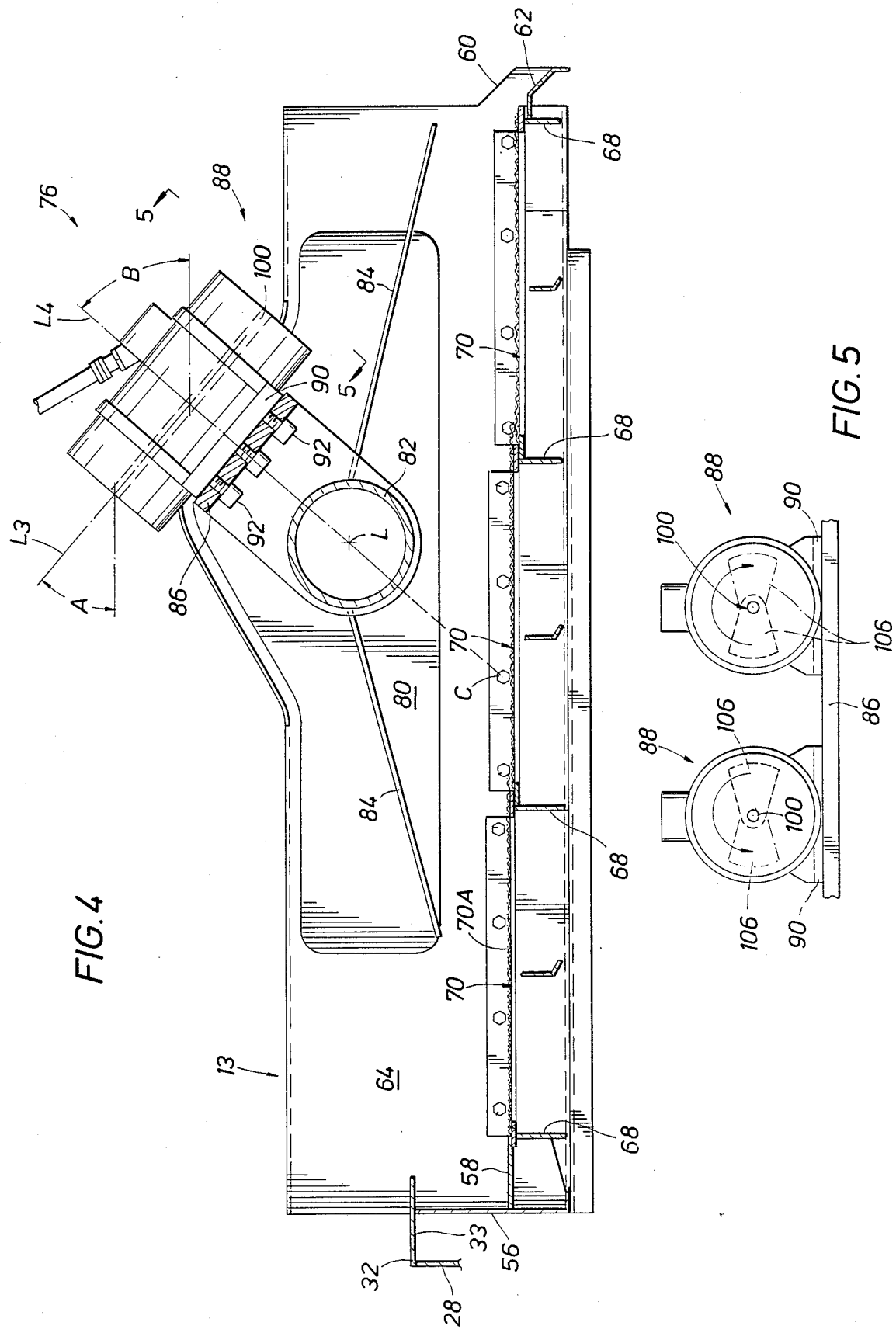

DRILLING MUD SEPARATION SYSTEM

BACKGROUND OF THE INVENTION

This invention relates to a separation system for removing drilled solids from a drilling fluid being circulated in a well and more particularly to an apparatus and method for such a system having an improved means and method for vibrating the screen apparatus.

Heretofore, it has been common in screening apparatus for the separation or removal of solids from drilling muds or the like to provide means for vibrating or shaking the screens along which the materials being separated are travelling. Such vibration means have, for example, included a pair of oppositely rotating eccentrics which induce vibrations or vibratory motion to the separation means or screens. Also, weight have been provided on the vibratory means which have been eccentrically mounted on parallel shafts rotated in opposite directions. However, such prior art vibrating devices have not produced a generally uniform linear motion parallel to the direction of travel along the separator screens by the materials being separated.

Also, such prior art vibrators for drilling fluids and entrained formation cuttings have imparted a relatively large back and forth vibratory movement to the screen in the direction of travel of the materials along the screen.

A relatively large back and forth vibratory movement of the screen, such as around eight mils 0.008 inch) in each direction for example, results in substantial frictional contact between the screen and solid materials, as well as substantial frictional contact between adjacent solid particles thereby tending to break up or abrade the large particles, some of which may then pass the screen. It is desirable to remove a maximum amount of the solid particles above a predetermined size.

SUMMARY OF THE INVENTION

The present invention provides an apparatus and method for separating materials having different particle sizes, and particularly to such apparatus and method having a vibratory motion exerted against the screen on which the materials are travelling during the separation of the materials. A generally uniform linear motion is imparted by the vibration means against the screen as the materials being separated are moving in a generally uniform linear direction along the screen thereby to provide a minimum retention time on the separating screen to result in a highly efficient screening of materials in a minimum of time.

The vibrator means comprises a pair of spaced parallel motor vibrators having rotatable shafts extending in a plane parallel to the movement of the materials along the screen. Such a vibratory means results in a minimal back and forth vibratory movement of the screen thereby to minimize frictional contact between the solid materials and the screen, and to minimize frictional or abrasive contact between adjacent solid particles. Such a minimal back and forth vibratory screen movement in preferably between about three and four mils (0.003–0.004 inch) in each direction along the travel path of the materials and results in a high rate of travel of the solid materials along the screen. Under certain conditions it is believed that a vibratory screen movement in each direction as low as around two mils and as high as around five mils would function satisfactorily with the present invention.

The vibratory motion is first imparted to parallel sides of a base support frame for the screen by the pair of parallel transversely aligned motor vibrators mounted on a base extending between and secured to the sides. The motor vibrators are mounted equidistantly on opposite sides of the longitudinal centerline of the screen, each motor vibrator having a rotatable shaft with a rotational axis extending in a plane parallel to the centerline of the screen and the movement of the materials along the screen. The rotatable shaft of each of the vibrators has an eccentric weight on each end thereof and the axis of each shaft extends at an angle between 15° and 75° with respect to the horizontal thereby to exert a thrust action against the sides of the support frame and the screen at an angle which is along a plane generally parallel to the movement of the materials along the screen or providing uniform linear motion.

It is an object of the present invention to provide a vibratory screen apparatus and method for separation of materials in which an improved linear vibratory motion is imparted to the screen support means and the screen during the screening operation for providing a generally uniform linear motion thereby to increase the rate of movement of the materials along and through the screen apparatus.

A further object of this invention is to provide such a vibratory screen apparatus and method in which a minimal back and forth movement of the screen is provided for minimizing frictional contact between the screen and particulate materials.

It is a further object of this invention to provide such a vibratory screen apparatus and method which utilize a pair of motor vibrators having rotational axes extending in vertical planes generally parallel to the linear movement of the materials along the screen for imparting a vibratory movement along a thrust line passing through the center of gravity of the vibratory frame.

BRIEF DESCRIPTION OF THE DRAWINGS

FIG. 4 is a sectional view taken generally along line 4—4 of FIG. 1 and showing the mounting of the motor vibrators on the mounting base extending between the sides of the base support frame;

FIG. 5 is an enlarged end elevation of the pair of motor vibrators looking along line 5—5 of FIG. 4 and showing the shafts thereof rotating in opposite directions;

DESCRIPTION OF THE INVENTION

Figure 1:
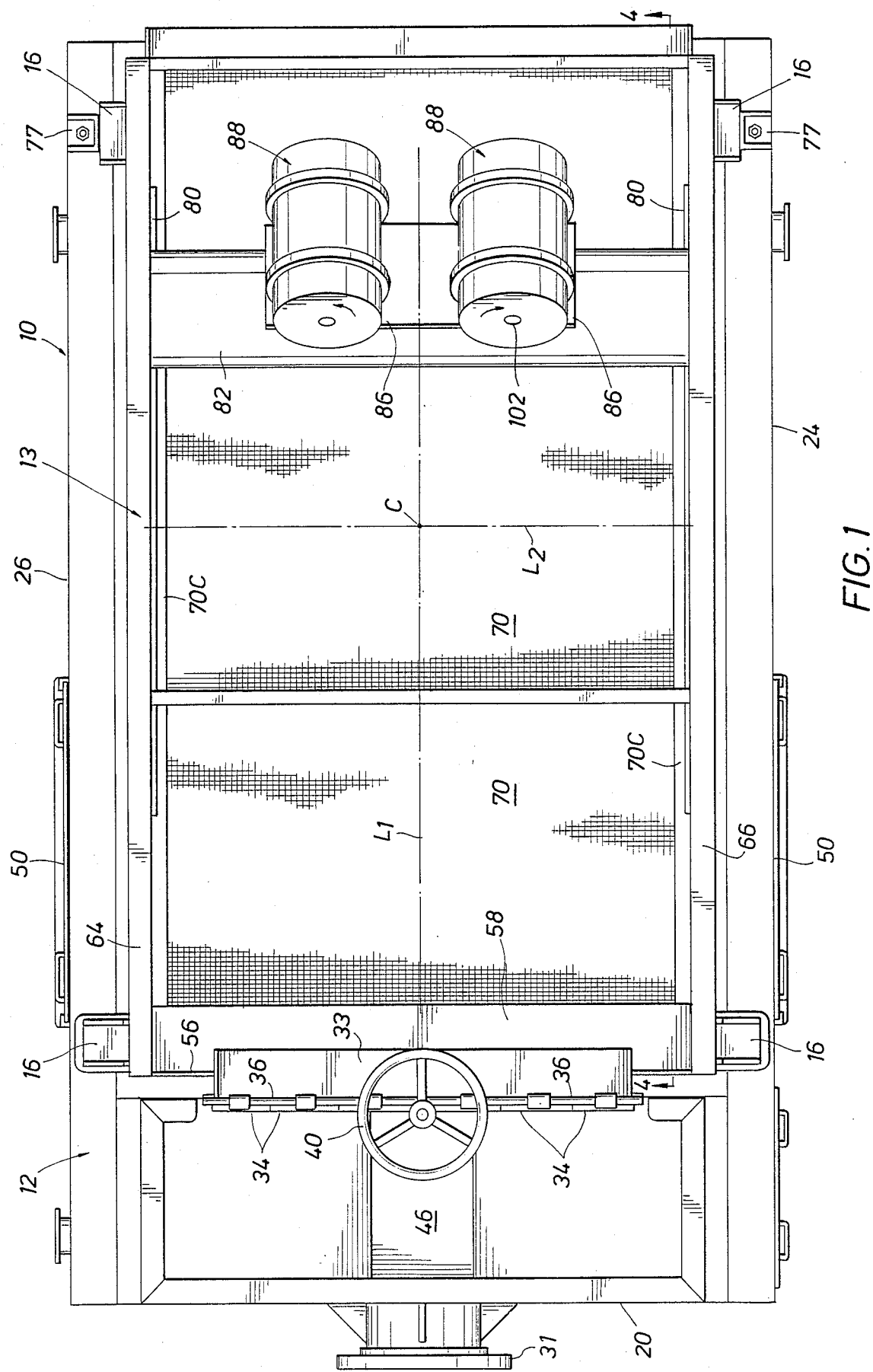
FIG. 1 is a plan view of the apparatus for separating materials forming the present invention and showing the support frame and screen supported thereby with a pair of motor vibrators mounted on a base over the screen in parallel relation to each other.

Referring now to the drawings for a better understanding of this invention, the vibratory screen apparatus forming the present invention is shown generally at 10 and as illustrated, is for the separation of solids from drilling fluids or drilling muds obtained from a well bore. The screen apparatus 10 includes a lower base or table shown generally at 12 on which is mounted an upper support frame for the screen bed and generally indicated at 13. Support frame 13 is generally rectangular n shape and resiliently mounted on lower base 12 by four spring units 14 positioned adjacent the corners of upper support frame 13 and mounted on brackets 16 carried by upper support frame 13 thereby to permit vibratory movement of upper support frame 13 relative to fixed base 12.

Lower base 12 includes a base plate 18 which may be supported on a supporting surface, such as a ground surface or a floor, and a pair of opposed end walls 20 and 22 connected to a pair of side walls 24 and 26. An intermediate wall 28 extends in parallel relation to rear end wall 20 to define an inlet chamber 30 having an inlet line 31 to receive the materials to be separated which are normally a combination of solids and liquids from the well bore.

Intermediate wall 28 has an upper opening 32 therein through which the materials to be separated flow over a ledge or plate 33 for discharge onto upper support frame 13 for separation. To provide a generally uniform cross-section of materials being received by upper support frame 13, a plurality of flaps 34 are mounted for pivotal movement about a supporting shaft 36 for evening or smoothing out the flow of material across the width of upper support frame 13. Thus, opening 32 and plate 33 act as a weir over which the materials to be separated flow.

A hand wheel 40 has an operating shaft 42 thereon which is threaded within a sleeve 44 and connected at its lower end to a gate member 46 mounted in a suitable guideway for movement between open and closed positions relative to a bypass inlet shown at 48. Upon manual rotation of handwheel 40, gate 46 is lifted to open the inlet 48 to the bypass for diverting the materials to an outlet 49 connected to a suitable conduit (not shown) for return to the well bore or other areas without being separated. removable cover 50 is shown over outlet 49 in FIGS. 1 and 2. Also, to receive the materials passing vertically downwardly through the screen bed on support frame 13, a slope sheet 51 has diverted sides 52 sloping to discharge outlet 49 for return of materials to the well bore.

Referring to upper support frame 13 which resiliently supports the screen bed along which the materials to be separated flow from chamber 30, a material receiving end is shown at 56 including a horizontal end plate 58. The other opposite discharge end of frame 13 is shown at 60 defining a lower discharge chute 62 over which the screened materials flow for discharge into a suitable material handling device such as a conveyer (not shown) or a material discharge pile to be dispensed by workman or the like. The materials to be separated flow from the receiving end 56 to the discharge end 60 along the screen bed formed between a pair of parallel sides 64 and 66. Transversely spaced frame members 68 extend between and are secured between sides 64 and 66 beneath the screen bed which is formed by a plurality of screen panels 70 positioned in end to end relation.

Figure 8:
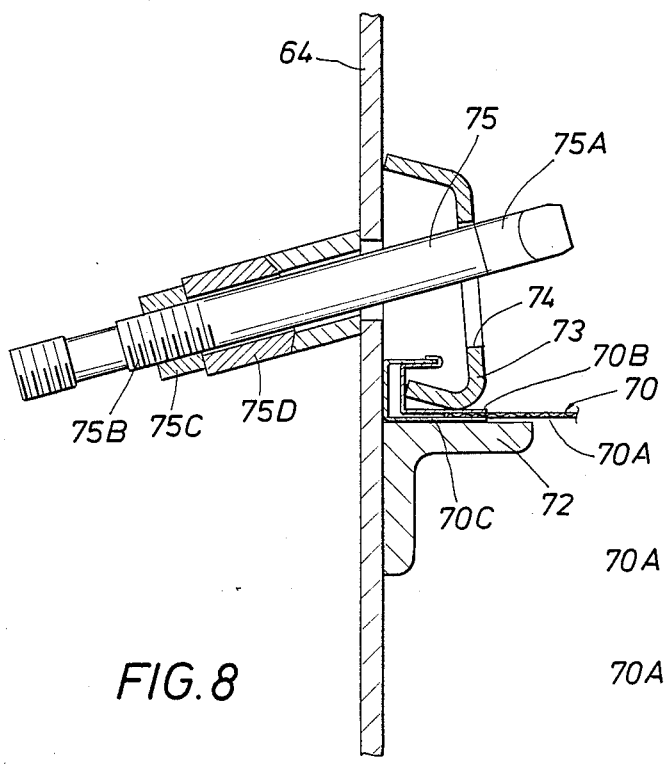
FIG. 8 is an enlarged cross-sectional view of the means for removably securing the screen panels in position for forming the screen bed.

A screen panel 70 is mounted between each pair of adjacent transverse members 68 and panels 70 form a continuous screen for support frame 13. Three screen panels 70 are illustrated in the drawings and each panel 70 includes a wire or plastic mesh material 70A of a predetermined mesh or size to form the screen bed. As shown particularly in FIG. 8, an inner channel shown at 70B is secured to the outer edge or side of each panel 70 and is received within an outer channel 70C supported on an angle 72 secured to side 64. A mounting bracket 73 has a leg received within channel 70B and an opening 74 receives a disconnectable tensioning bolt 75. Bolt 75 has a C-shaped clamping end at 75A engaging the adjacent face of bracket 73 and the opposite end is threaded at 75B to receive a nut 75C adjacent a metal sleeve 75D. Bracket 73 applies a tension force against inner channel 70B thereby to apply tension to the screen panel 70 and urge channel 70B toward outer channel 70C. Individual panels 70 may be removed for repair or replacement upon removal of bolts 75 and brackets 73. It is to be understood that any desired number of screen panels 70 may be provided, or a single continuous screen may be provided, if desired.

To raise or lower the discharge end 60 of support frame 13 relative to the receiving end 56, a manually operated jack 77 is provided on opposite sides of discharge end 60 adjacent each spring means 14. The discharge end 60 for drilling fluids and solids may be raised or lowered to the desired positive or negative slope which is dependent, for example on such factors as the type of materials being screened, the type of drilling fluid, the amount of liquid in the drilling fluid and entrained solids, the degree of viscosity, the screen size, and the particle size. The movement of materials being separated along the screen bed is preferably along a continuous uniform slope either in an upward direction or a downward direction of less than around ten degrees (10°) for drilling muds containing solids therein. A slope which has been found to be satisfactory for several drilling fluids and entrained solids has been a positive slope of three (3) degrees.

Support frame 13 forms a screen shaker for the materials being separated and is mounted for vibratory movement relative to base 12. The improved vibratory means comprising the present invention and imparting an improve vibratory motion to frame 13 and to the materials moving along frame 13 is shown generally at 76. Each of the parallel sides 64 and 66 has an upwardly extending arcuate projection shown at 78. A reinforcing plate 80 is secured to the inner surface of each side 64 and 66. A tubular support base indicated at 82 and having a longitudinal axis L extends between and is secured to reinforcing plates 80 on sides 64 and 66. To provide additional reinforcing, reinforcing strips shown at 84 are secured to reinforcing plates 80 and to tubular member 82. If desired, additional reinforcing plates could be provided on the outer surface of sides 64 and 66.

Figure 2:
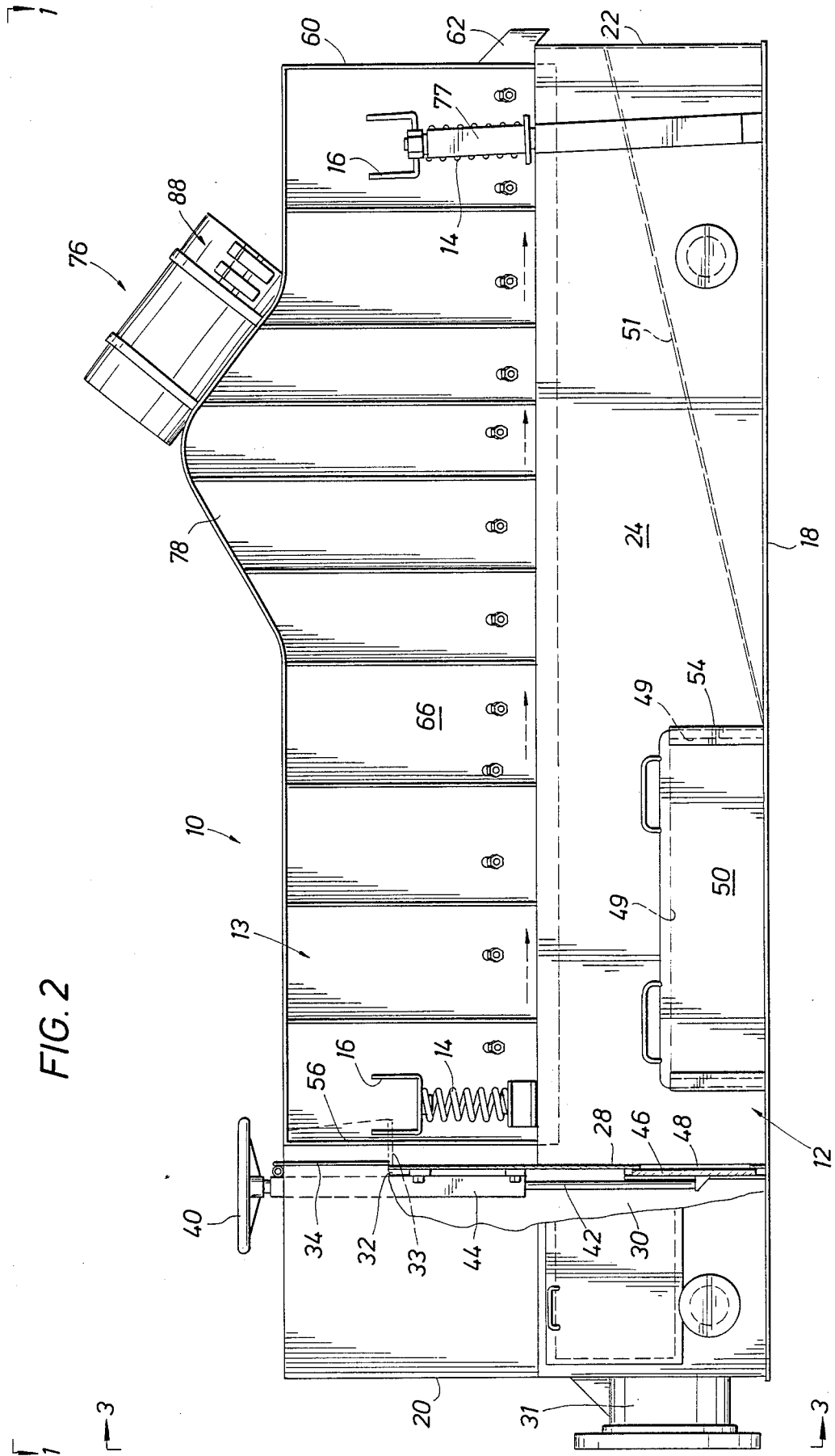
FIG. 2 is a side elevation of the apparatus shown in FIG. 1.
Figure 3:
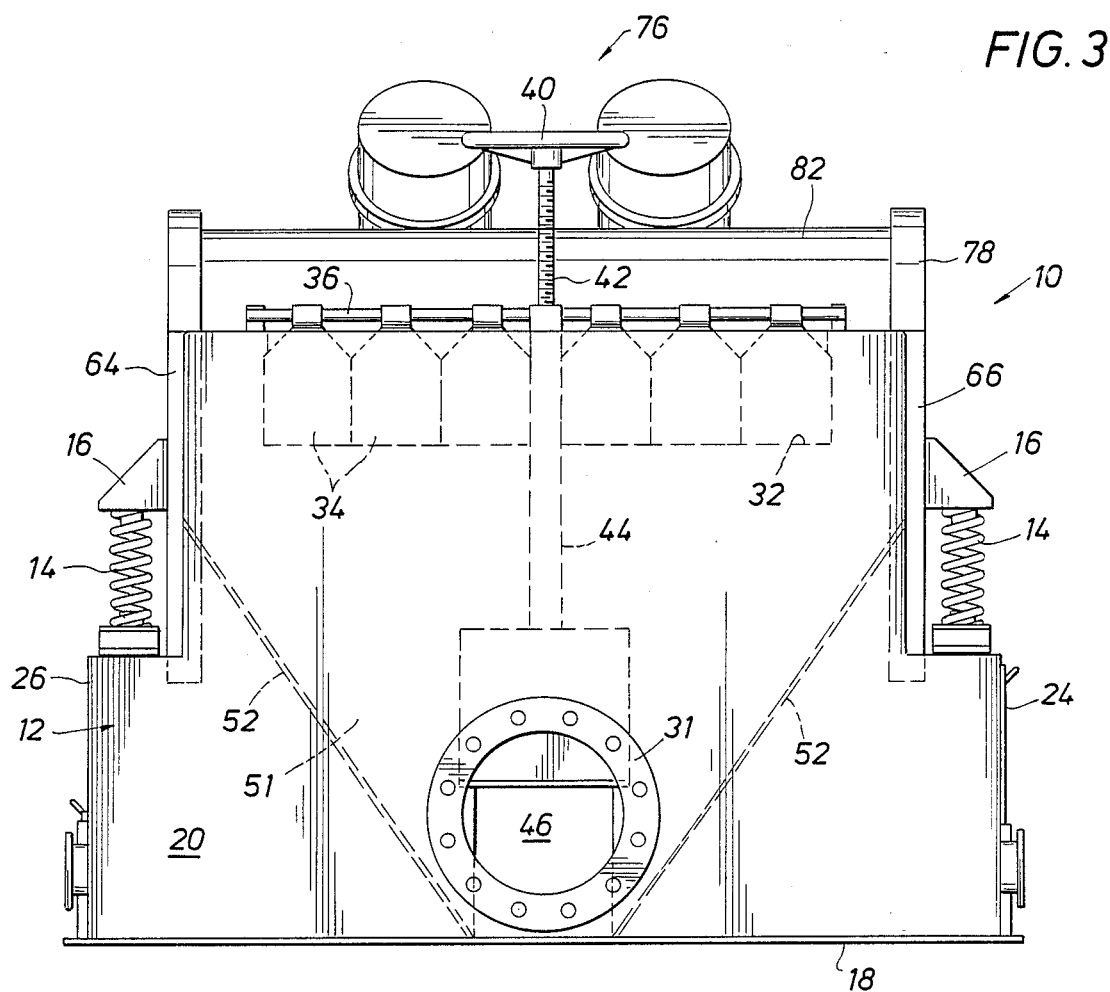
FIG. 3 is a rear end elevation of the apparatus shown in FIGS. 1 and 2.
Figure 6:
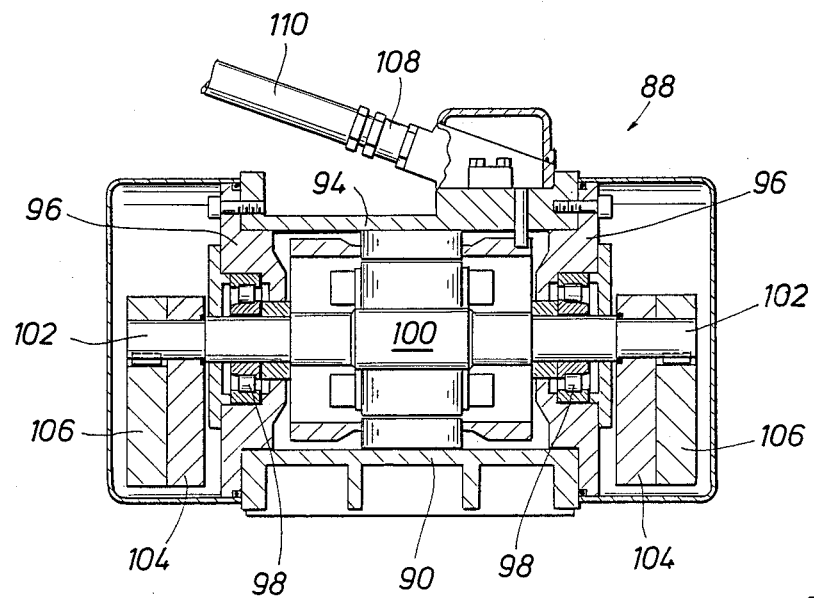
FIG. 6 is an enlarged section of one of the motor vibrators shown in FIG. 5.
Figure 7:
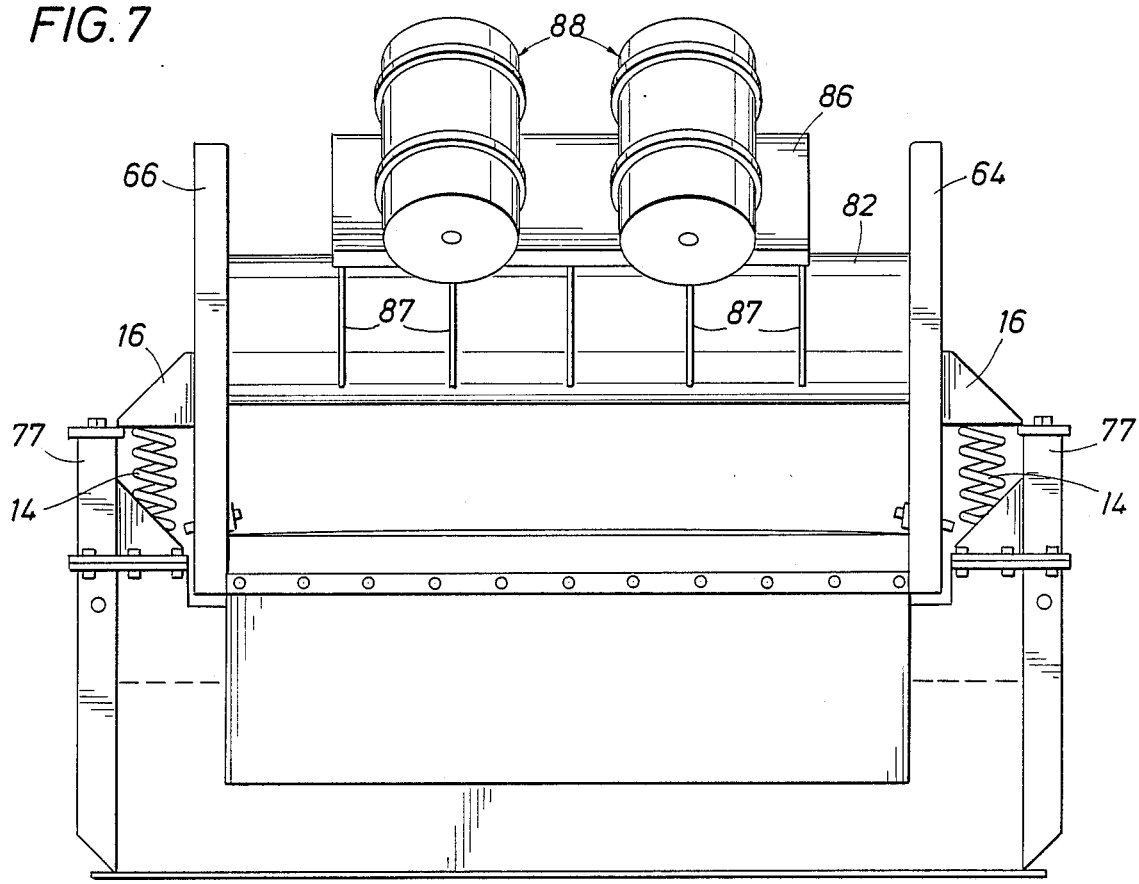
FIG. 7 is a front end elevation of the apparatus shown in FIGS. 1 and 2.

The longitudinal centerline of the rectangular screen bed is shown by line L1 in FIG. 1 and the transverse centerline of the screen bed is shown at L2. It is noted from FIG. 1 that tubular support 82 is mounted on support frame 13 at a distance along the length of frame 13 around ¾ of the length from the receiving end 56. Mounted on tubular support 82 on opposed sides of longitudinal centerline L1 and in generally equidistant relation thereto is a support plate or pad 86 secured to tubular support 82 by a plurality of spaced parallel arms 87.

Mounted on bas support plate 86 are a pair of motor vibrators generally indicated at 88 each having a lower mounting plate 90 secured to plate 86 by suitable nut and bolt combinations 92. Each motor vibrator has an elongate tubular shell or body 94 having opposed end plates 96 secured thereto and supporting bearing housings 98 which receive a shaft 100 mounted therein for rotation. Shaft 100 has a rotor secured thereto and each end of shaft 100 has an end portion 102 which extends outwardly from the adjacent bearing housing 98. Mounted on each end portion 02 of shaft 100 in eccentric relation are a pair of inner and outer weights 104, 106. Each motor vibrator 88 has an extension 108 which is adapted for connection to a suitable source of electrical energy such as a cable shown at 110. Shafts 100 of the pair of motor vibrators 88 rotate in opposite directions to provide a more balanced uniform vibratory motion exerted against tubular support 82 and support frame 13. The weights on shafts 100 are in phase with each other as shown in solid lines in FIG. 4.

While motor vibrator 88 are shown in equidistant relation on opposed sides of centerline L1, some variation from a true equidistant relation to centerline L1 would function satisfactory.

The longitudinal axis of shaft 100 is shown at L3 in FIG. 4 extending at an angle A of around 40° with respect to the horizontal and along a vertical plane parallel to the longitudinal axis 1 of the screen bed. For best results, angle A should be around 35° to 45° but would function satisfactory at an angle A between around 15° to 75°. The vibratory motion imparted by motor vibrators 88 is exerted along a thrust line representing the center of mass of motor vibrators 88 and shown at L4. Thrust line L4 preferably intersects and extends radially from longitudinally axis L of tubular member 82. Thrust line L4 extends at an angle B of around 50° with respect to the horizontal and is preferably within an optimum range of around 45° to 55°. It is believed that angle B would function satisfactorily between 15° to 75°. It is noted that the sum of angles A ad B equals 90° so in the event angle B is around 60°, then angle A is around 30°.

Thrust line L4 is along the plane in which the vibratory motion is exerted or impacted by motor vibrators 88 which are mounted to provide a uniform linear vibratory motion, first to the opposed sides 64 and 66 of support frame 13, and then to screen panels 70 forming the screen bed along which the materials being separated travel in a generally linear path from receiving end 56 to discharge end 60. The vibratory motion acting along thrust line L4 is preferably through the center of gravity of the entire weight of the unloaded support frame 13 which is illustrated at C in FIGS. 1 and 4. While the screening apparatus will function satisfactorily if thrust line L4 is offset a limited distance from such center of gravity C, for best results, thrust line L4 should be offset horizontally no more than fifteen percent (15%) of the total length of frame 13 from center of gravity C.

A uniform linear movement is directed along the center o gravity of the mass of the material being separated as it is moving along the screen bed. While thrust line L4 is shown as intersecting longitudinal axis L of tubular member 82 it is obvious that the plane of thrust line L4 could be offset horizontally from longitudinal axis L. In order to obtain best results, it is believed that the plane of thrust line L4 should not be offset horizontally from longitudinal axis L of tubular support 82, or offset horizontally from the center of gravity C of the total mass of frame 13, more than around 15% of the length of the screen bed of support frame 13. For example, if the length of the screen bed is around one hundred (100) inches, then thrust line L4 should not vary or be offset more than ten (10) to fifteen (15) inches from center line L of the support 82, or from center of gravity C of frame 13 on which the motor vibrators 88 are mounted for imparting the vibratory motion to opposed sides 64 and 66, and thence to the screen bed.

The rotational speed of motor vibrators 88 may be constant or varied, as desired, dependent primarily on the type and size of the materials being separated. A rotational speed between eight hundred (800) revolutions per minute (rpm) and two thousand (2000) revolutions per minute (rpm) is normally provided.

It is desirable to separate the maximum amount of formation cuttings from the drilling mud so that the drilling mud with predetermined small size particulate material is returned to the mud pit for return to the well. A minimal contact between the screen wire and the particulate material is desirable as friction between the screen wire and large size particles greater than the screen mesh tends to break up the large size particles into particles that pass the screen mesh thereby increasing the amount of particulate material entrained in the drilling mud for return to the well. The mounting of vibrators 88 in the manner described above provides a generally uniform flow of fluid with entrained solids longitudinally along the screen bed with a minimal friction provided by the screen wire mesh thereby to improve the rate of travel and the amount of undesired solid material removed from the drilling fluid.

The mounting of vibrators 88 with shafts 100 thereof extending in a direction parallel to the direction of travel of the materials being separated along the screen bed results in a minimal negative force opposing the direction of travel. As a result, minimal frictional contact between adjacent solid particles and the screen is provided thereby minimizing the scaling or breaking off of portions of the large diameter solids and providing an improved rate of travel along the screen bed. The negative forces generated by the vibrators 88 of the present invention have been reduced over fifty (50) percent over prior art devices having vibrators with rotating shafts extending transversely of the direction of travel of the material along the screen bed.

Figure 9:
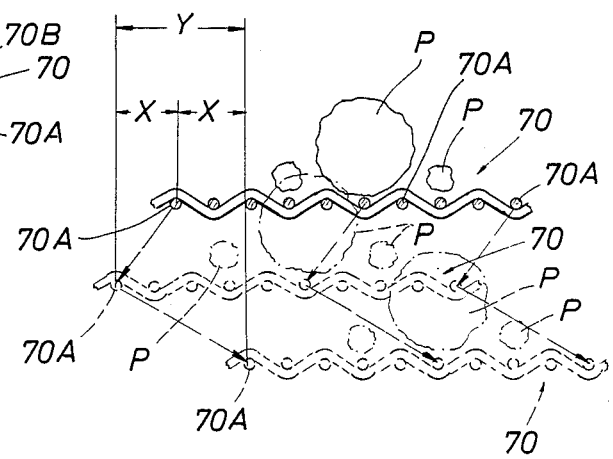
FIG. 9 is a schematic view showing the back and forth vibratory movement of the screen with solid materials travelling along the screen.

Referring to FIG. 9, a generally schematic view is provided to illustrate at different phases the back and forth vibratory movement of screen panels 70 in the direction of travel of the materials along the screen bed. The wire mesh 70A and particles P moves a distance X in a forward direction and an equal distance in a rearward direction for each vibratory cycle with the total movement or amplitude of wire mesh 72A shown at Y which is twice the amount of X.

It is desirable to have a minimal movement of wire mesh 70A while maintaining a specific travel speed of the materials being separated along the screen bed. A movement of mesh 70A of around 3.5 mils (0.0035 inch) in each direction or a total movement or amplitude of 7 mils (0.0070 inch) has been found to be optimum as illustrated at X and Y in FIG. 9. Thus, a value of between three and four mils for X is optimum while a value as high as five mils and as low as two mils would be satisfactory under certain conditions. It is noted that prior art devices with vibrators having rotational axes extending transversely of the screen bed have a screen travel over twice the screen travel of the present invention.

The present invention utilizing the improved vibratory means for imparting an improved vibratory action in a generally uniform linear direction has resulted in an increased uniform flow of materials along the screen bed to be separated. Such increased capacity has been between around 15% and 20% and further, it has been noted that the solid mass which is discharged from the rear end of the screen mesh has been drier and retained less liquid than heretofore. Therefore, a higher quality of drilling mud is returned to the mud pit containing an increased amount of the weighting agent, such as barite, and added soluble materials, such as bentonite. While an electric motor vibrator has bee illustrated, it is to be understood that an eccentric vibrator could be rotated by other means, such as a hydraulic or pneumatic motor, for example.

While a preferred embodiment of the present invention has been illustrated in detail, it is apparent that modification of adaptation of the preferred embodiment will occur to those skilled in the art. However, it is to be expressly understood that such modification of adaptation are within the spirit and scope of the present invention as set forth in the claims.

What is claimed is:

1. In a drilling system for a well bore hole having a predetermined drilling fluid for continuous circulation in said bore hole, an vibratory separation apparatus, means to supply the drilling fluid and entrained drilled solids from the bore hole directly to the separation apparatus for separation, and means to return separated drilling fluid from the separation apparatus directly to the bore hole;

said vibratory separation apparatus comprising:
a base support frame;
means supporting said support frame for relative shaking movement;
a generally planar mesh screen on said base support frame forming a bed to receive the drilled solids and drilling fluid from the bore hole for travel in a generally horizontal linear path for being separated with said screen defining a longitudinal centerline centrally of its width;
a pair of opposed sides on said base support frame extending generally vertically upwardly from opposed sides of said screen;
a generally rigid mounting base extending horizontally between and secured to said sides over said screen;
a pair of parallel transversely aligned motor vibrators mounted on said mounting base, each of the motor vibrators having a rotatable shaft with a longitudinal axis thereof extending in a plane generally parallel to the longitudinal centerline of the screen, the longitudinal axis of rotation of said shaft being at an angle between about 15° and 75° with respect to the horizontal and exerting a thrust during operation thereof against the mounting base for vibration of the mesh screen back and forth along the longitudinal axis of said frame between about two and five mils in each direction, the shafts of said motor vibrators rotating in opposite directions and having an eccentric weight at each end of the shaft, the vibration of said mesh screen between about two and five mils in each direction providing minimal frictional contact between the drilled solids and said mesh screen to minimize the breakup and scaling of solids moving along the screen; and means on said base support frame to adjust the slope of the screen and the travel path of the drilled solids and drilling fluid along said bed between desired upwardly and downwardly inclined slopes, said screen having a front end on which the drilled solids and drilling fluid are deposited for travel therealong and a rear end from which the screened drilling solids are discharged with said separated drilling fluid being returned to the bore hole.

2. In a drilling system as set forth in claim 1;
said motor vibrators and said mounting base therefor being located over said bed at a position along its length closer to said rear end than said front end.

3. In a drilling system as set forth in claim 1 wherein the center of the mass of said motor vibrators exerts a thrust during operation thereof in a direction toward the rigid mounting base for said motor vibrators.

4. In a drilling system as set forth in claim 3 wherein said thrust is directed along a plane not offset substantially from the center of gravity of said support frame.

5. In a drilling system as set forth in claim 1 wherein a plurality of rectangular screen panels form a bed along which the materials to be separated travel in a generally linear direction from a front receiving end to a rear discharge end; and means are provided adjacent the discharge end of said base support frame to raise said discharge end for adjusting the slope of the rectangular screen and the travel path of the materials along said bed.

6. In a drilling system as set forth in claim 1;
said motor vibrators each have a base support secured to said rigid mounting base and the center of the mass of each motor vibrator exerts a thrust during operation thereof not deviated from the longitudinal axis of said mounting base an amount more than 15% of the travel length of the materials to be separated along the bed.

7. In a drilling system for a well bore hole having a predetermined drilling fluid for continuous circulation in said bore hole, an vibratory separation apparatus, means to supply the drilling fluid and entrained drilled solids from the bore hole directly to the separation apparatus for separation, and means to return separated drilling fluid from the separation apparatus directly to the bore hole;

said vibratory separation apparatus comprising:
a base support frame;
means supporting said support frame for relative shaking movement;
a screen of a generally planar mesh material on said base support frame forming a bed to receive the drilled solids and drilling fluid for travel in a generally horizontal linear path for being separated with said screen defining a longitudinal centerline centrally of its width;
a pair of a opposed sides on said base support frame extending generally vertically upwardly from opposed sides of said screen;
a generally rigid mounting base extending horizontally between and secured to said sides over said screen;
a pair of parallel transversely aligned motor vibrators mounted on said mounting base, each of the motor vibrators having a rotatable shaft with a longitudinal axis thereof extending in a plane generally parallel to the longitudinal centerline of the screen, the longitudinal axis of rotation of said shaft being at an angle between about 15° and 75° with respect to the horizontal and exerting a thrust during operation thereof against the mounting base, said vibrators vibrating said base support frame and said screen to provide a vibratory back and forth movement of said mesh material along the longitudinal axis of said frame between about two and five mils in each direction, the vibration of said screen between about two and five mils in each direction providing minimal frictional contact between the drilled solids and the screen to minimize the breakup of solids moving along the screen thereby to maximize the amount of drilled solids retained on the screen;

means on said base support frame to adjust the slope of the screen and the travel path of the drilled solids and drilling fluid along said bed between predetermined upwardly and downwardly inclined slopes, said screen having a front end on which the drilled solids and drilling fluid are deposited for travel therealong and a rear end from which the screened drilling solids are discharged;

said motor vibrators and said mounting base therefor being located over said bed at a position along its length closer to said rear end than said front end and closer to the longitudinal centerline of the bed than the sides of the support frame, the center of mass of said motor vibrators exerting a thrust during operation thereof in a direction toward the center of gravity of said support frame.

* * * * *